US006601873B1

(12) United States Patent
Bartesch et al.

(10) Patent No.: US 6,601,873 B1
(45) Date of Patent: Aug. 5, 2003

(54) MOTOR VEHICLE HAVING A CRUMPLE ZONE, PASSENGER COMPARTMENT AND DEFLECTING RAMPS

(75) Inventors: Hans-Georg Bartesch, Böblingen (DE); Kark-Heinz Baumann, Bondorf (DE); Ulrich Bruhnke, Ehningen (DE); Rainer Justen, Sindelfingen (DE); Jürgen Kohler, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/551,601

(22) Filed: Apr. 17, 2000

(30) Foreign Application Priority Data

Apr. 16, 1999 (DE) .......................... 199 17 177
Apr. 6, 2000 (EP) ............................ 00107431

(51) Int. Cl.⁷ ................................ B62D 7/22
(52) U.S. Cl. .................... 280/784; 296/188; 296/192; 296/203.02
(58) Field of Search ................ 280/784, 781; 180/274; 296/293, 192, 203.02

(56) References Cited

U.S. PATENT DOCUMENTS

| | | | | |
|---|---|---|---|---|
| 2,525,339 A | | 10/1950 | Chausson | 296/28 |
| 3,596,978 A | * | 8/1971 | Wessells, III | 296/28 R |
| 3,718,364 A | * | 2/1973 | Fischer et al. | 296/28 R |
| 3,743,347 A | * | 7/1973 | Shaw | 296/35 R |
| 3,794,342 A | * | 2/1974 | Froumajou et al. | 280/106.5 R |
| 3,837,422 A | * | 9/1974 | Schlanger | 180/91 |
| 3,881,742 A | | 5/1975 | Felzer | 280/106 R |
| 4,560,198 A | * | 12/1985 | Katano et al. | 296/185 |
| 4,669,777 A | * | 6/1987 | Harasaki et al. | 296/194 |
| 4,826,209 A | * | 5/1989 | Farris | 280/784 |
| 5,020,846 A | | 6/1991 | Bonnett | 296/186 |
| 5,275,436 A | | 1/1994 | Pomero | 280/784 |
| 5,348,113 A | * | 9/1994 | Drvota et al. | 180/271 |
| 5,704,644 A | * | 1/1998 | Jaggi | 180/311 |
| 5,738,378 A | * | 4/1998 | Yazejian | 280/784 |

FOREIGN PATENT DOCUMENTS

| | | |
|---|---|---|
| DE | 1 630 211 | 12/1970 |
| DE | 1 630 210 | 1/1971 |
| DE | 2 257 940 | 6/1974 |
| DE | 30 35 333 | 6/1982 |
| DE | 33 02 564 | 8/1983 |
| DE | 197 08 404 | 10/1997 |
| DE | 297 03 663 | 10/1998 |
| EP | 0 255 749 | 2/1988 |
| EP | 0 354 325 | 2/1990 |
| GB | 1 212 878 | 11/1970 |
| WO | WO 94/06669 | 3/1994 |

\* cited by examiner

Primary Examiner—Lesley D. Morris
Assistant Examiner—Paul Royal, Jr.
(74) Attorney, Agent, or Firm—Crowell & Moring LLP

(57) ABSTRACT

The invention relates to a motor vehicle with a supporting structure provided at one end of a safety passenger compartment with a crumple zone and two wheel arches located in the vicinity of the crumple zone on the sides. A wheel is located in each respective wheel arch held by wheel guide members. A deflecting area extends diagonally to a central lengthwise axis of the motor vehicle for the associated wheel, between the safety passenger compartment and the rolling circumference of the two wheels in the straight-ahead position of the deflecting surface for the associated wheel against which the wheel moved by the crash-produced deformation of the crumple zone against the deflecting surface is deflected past the end of the safety passenger compartment. The deflecting surfaces are diagonally downwardly directed deflecting ramps by which the wheels are directed toward the safety passenger compartment and below the floor of the motor vehicle as the crumple zone collapses.

20 Claims, 6 Drawing Sheets

MOTOR VEHICLE HAVING A CRUMPLE ZONE, PASSENGER COMPARTMENT AND DEFLECTING RAMPS

BACKGROUND AND SUMMARY OF THE INVENTION

This application claims the priority of German Patent Application 199 17 177.7, filed Apr. 16, 1999, and European Patent Application EP 001 07 431.9, filed Apr. 6, 2000, the disclosure of which are expressly incorporated by reference herein.

The invention relates to a motor vehicle with a supporting structure provided at at least one end of a safety passenger compartment with a crumble zone and two laterally located wheel arches in each of which a wheel is held by wheel guide members.

A motor vehicle of this kind with a front end that forms the crush or crumple zone is already known for example from German Patent 22 57 940. The wedge-shaped deflecting elements consist of sheet metal plates welded together into a block and are each fastened to the rear limiting wall of the front wheel arches. In the event of a front end impact following deformation of the crumple zone with its rolling circumference, the wheels strike the deflecting element associated with them and are supposed to be pushed diagonally outward and rearward from the wheel arches as a result of the deflecting action. As a result, under certain conditions, the front end of the safety passenger compartment can be pushed in by the front wheels. However, the circumstance is considered disadvantageous that the wheels assume a lateral overlapping position relative to the side doors of the motor vehicle and the ability of the side doors to open after an accident can be adversely affected. In addition, the effectiveness of the deflecting elements depends to a considerable degree on the design of the axle carrying the wheels and on the type of collision. Therefore, unfavorable axle or chassis designs or impact situations such as a collision with slight width overlap or a collision at a sharp angle to the central lengthwise axis of the motor vehicle can also cause an undesired block formation in which the affected wheel remains within the crumple zone and adversely affects its deformation process.

A goal of the invention is to improve a motor vehicle with a supporting structure in such a way that the opening ability of the side doors can be ensured even with a crumple zone that is almost completely collapsed as a result of a crash, when the deflecting function must be ensured largely independently of the wheel suspension or the type of collision.

This goal is achieved according to the invention by providing a motor vehicle with a supporting structure provided at at least one end of a safety passenger compartment with a crumble zone and two laterally located wheel arches in each of which a wheel held by wheel guide members is located whereby, between the safety passenger compartment and the rolling circumference of the two wheels associated with the crumple zone in the straight-ahead position, a deflecting surface running diagonally to a central lengthwise axis of the motor vehicle is provided for the associated wheel, at which wheel the wheel that is moved against the deflecting surface by the crash-produced deformation of the crumple zone is deflected past the end of the passenger compartment, wherein the deflecting surfaces are deflecting ramps directed diagonally downward, by which the wheels upon the collapse of the crumple zone are lowered below a floor of the motor vehicle in the direction of the passenger compartment.

Advantageous embodiments of the invention are described herein and in the claims.

The wheels that move toward the safety passenger compartment when the crumple zone collapses are pushed beneath the floor of the motor vehicle by the deflecting ramps directed diagonally downward according to the invention. As a result, the so-called block formation caused by the wheels remaining within the crumple zone is avoided; the wheels interfere considerably with the deformation process of the crumple zone and their possible deformation travel is reduced accordingly. As a result of the deflection of the wheel at the associated deflection ramp that takes place in such a crash, a greater or longer area of the crumple zone can be used for deformation which has a constantly increasing force level in an accident and therefore has a much lower load imposed on the occupants.

In addition, the wheels being lowered and guided beneath the floor of the motor vehicle ensures that the side doors, even in a crumple zone that is almost completely taken up as a result of a crash, can be opened without impediment by the wheels.

If the deflecting ramps are each formed by a dent-free boundary wall of the safety passenger compartment itself, no additional parts for the deflecting ramps are necessary. This feature is especially suited for compact or subcompact vehicles whose wheels are only a short distance from the passenger compartment.

Deflecting ramps which extend over their entire vertical distance approximately at right angles to the lengthwise central plane of the motor vehicle in the event of a crash, with a simple design, ensure guidance of the wheels that is approximately parallel to the lengthwise central plane.

In order for the wheels to be deflected especially reliably beneath the vehicle floor even in a full brake application initiated before the crash and an associated downward movement of the motor vehicle nose, it has proven to be advantageous for the deflecting ramps to extend at least to the height of the rotational axes of the wheels when the wheels are completely compressed.

It has been found to be especially advantageous for the front end of the passenger compartment to rise relative to the front end structure in a frontal collision as a result of cooperation of the front wheels with the front deflecting ramp caused by the crash, and the undesired vehicle-dependent pitching effect is avoided. As a result, the front end structure cannot be overridden by the other vehicle in the accident and related increased deformation of the front end structure can be prevented. In addition, in the event of a collision, an undesired rise of the vehicle occupants in their seats is prevented to the greatest extent.

Advantageously, the deflecting ramps are formed by suitably dent-free diagonal end wall areas of the safety passenger compartment itself since no additional parts are required. In order to produce a dent-resistant design for the end wall areas with low weight, the latter preferably consist of multi-wall or multi-layer lightweight construction panels.

In a supporting structure of a motor vehicle consisting completely of lightweight design panels, the lower end wall area can be beveled in a favorable manner and adjusted to the installation position of the wheels so that the entire lower area of the end wall is designed as a deflecting ramp without additional technical expense.

Other objects, advantages and novel features of the present invention will become apparent from the following detailed description of the invention when considered in conjunction with the accompanying drawings.

DETAILED DESCRIPTION OF THE DRAWINGS

Figure 1:
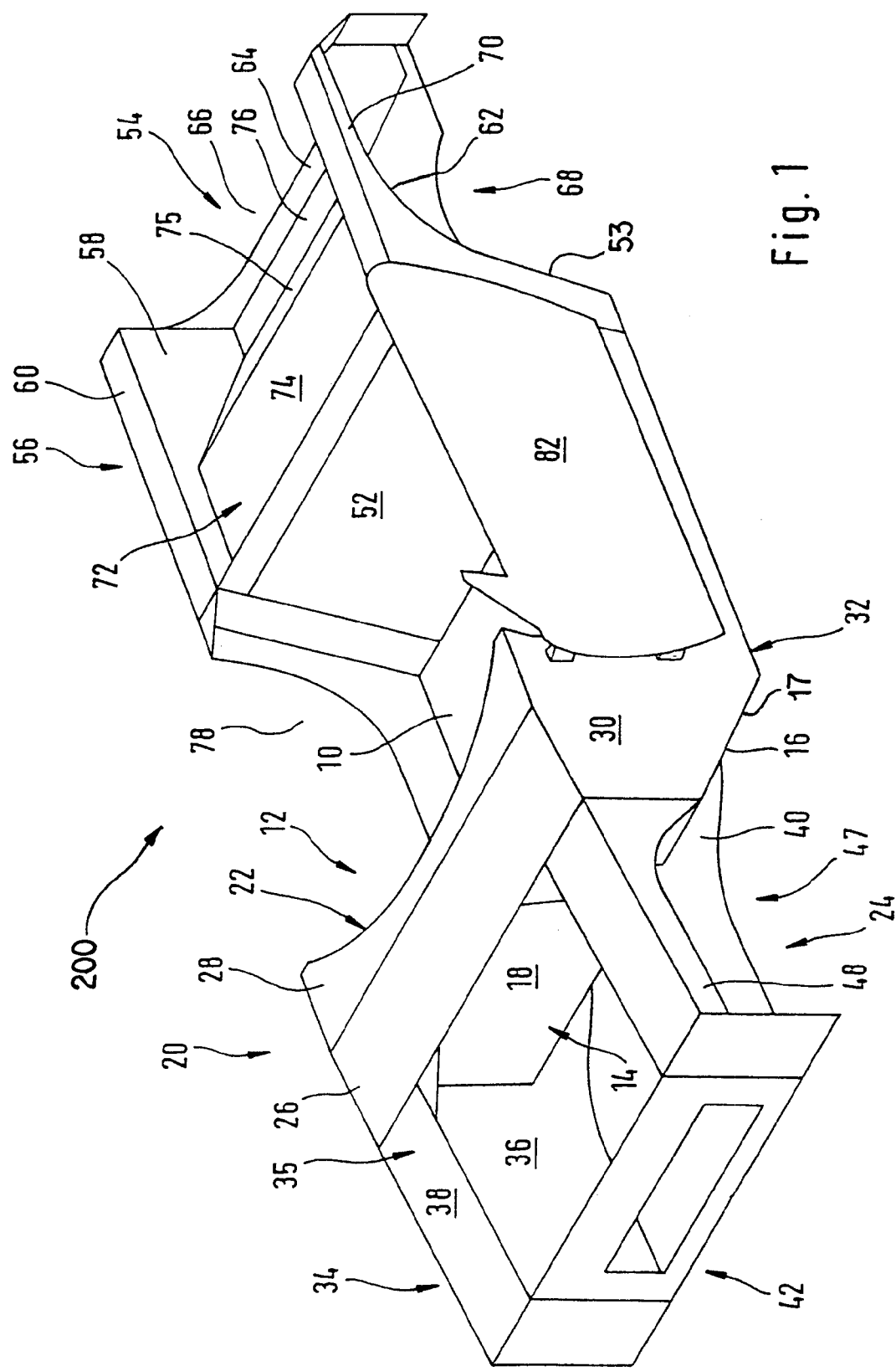
FIG. 1 is a perspective view diagonally from the front and above of the supporting structure of the motor vehicle according to the invention.
Figure 2:
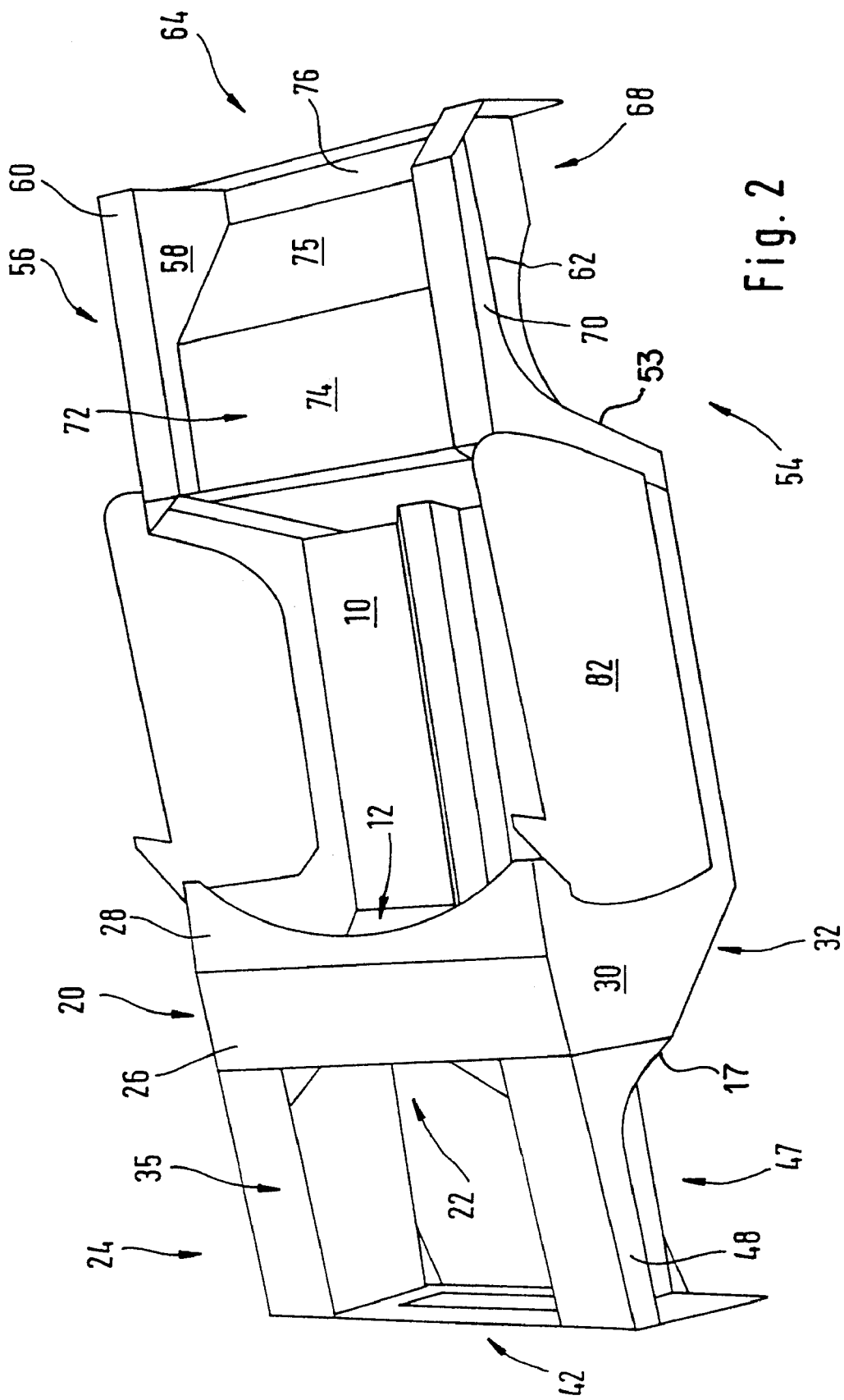
FIG. 2 is a perspective view of the supporting structure of the motor vehicle of FIG. 1 viewed from a point to the side and above.
Figure 3:
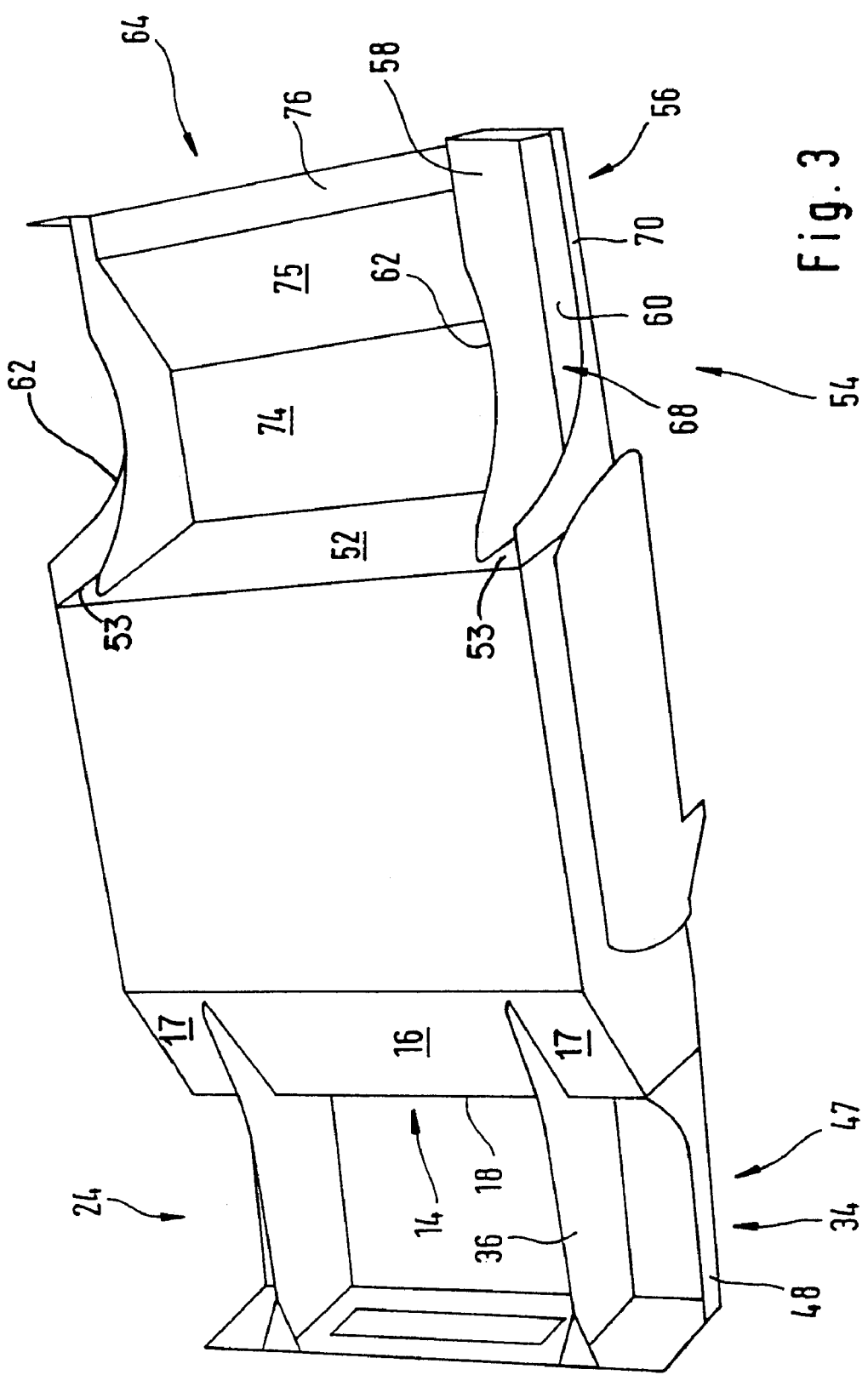
FIG. 3 is a perspective view laterally and from below of the supporting structure of the motor vehicle of FIG. 1.

In FIGS. 1 and 2, the supporting structure of a motor vehicle is shown in a perspective view diagonally from the front and above or laterally above the supporting structure of a motor vehicle which, in the embodiment shown, is composed essentially of flat plates and a supporting floor 10 in lightweight design. In a front foot area 12, floor 10 becomes an end wall 14 in multi-layer or multi-wall lightweight construction that delimits the passenger compartment at the front and has a transition area 16 that adjoins floor 12 and is directed diagonally forward and upward and includes a slightly vertical area 18 above area 16. End wall 14 with transitional area 16 extends over the entire width of floor 10. Laterally and above, foot area 12 is delimited by a plate arrangement 20 in lightweight construction that comprises a front and a rear upper lightweight plate 26, 28 and lateral supporting box walls 30. The lateral supporting box walls 30 are designed as a wall area of an associated side wall 32 of the supporting structure. Side wall 32 has a door cutout 78 for a side door of which FIGS. 1 to 3 show only a supporting door inner shell 82. The front end wall 14, floor 10, the two lateral supporting box walls 30, and the two upper lightweight construction plates 26, 28 form a rigid supporting box 22 to which a front end structure 24 designed as a front crumple zone is fastened. Floor 10, transition area 16, and upper area 18 of end wall 14 as well as upper lightweight plates 26, 28 either consist of a one-piece correspondingly bent plate or of a plurality of plates accordingly fitted together.

Front end structure 24 includes two front lengthwise beams 34 of lightweight design, each of which has a bent cross section with an approximately vertical plate leg 36 and a plate leg 38 running transversely thereto. At the front end of the lengthwise member 34, a front module 42 is fastened which includes a lightweight plate that runs in the transverse direction of the vehicle and slightly vertically. Lightweight plate 42 is adjusted in terms of its height to that of the vertical plate leg 36 and in its width to that of supporting box 22. Side walls 32 are extended forward up to front module 42 and provided with a wheel cutout 47 for an associated front wheel arch 40. Accordingly, side wall 32 is formed over the majority of the length of the associated lengthwise member 34 as a relatively narrow rib 48 which is fastened to the transverse plate leg 30 of the corresponding lengthwise member 34 approximately at right angles as well as to the front module 42. Together, the vertical and associated transverse plate legs 36, 38, the corresponding narrow rib 48, end wall 14, and front lightweight plate 42 form a front wheel arch 40 of the supporting structure in which a front wheel 41 (FIGS. 4, 5) held by wheel guiding members is located.

As is especially clear in FIGS. 1 to 3 and 5, between the safety passenger compartment 200 and the rolling circumference of the two front wheels 41 in the straight-ahead position, a deflecting surface 17 that runs diagonally to the central lengthwise axis of the motor vehicle is provided for the associated front wheel 41 that is formed as a deflecting ramp directed diagonally downward. The function of this deflecting ramp is described in greater detail below with reference to FIG. 6. The two front deflecting ramps 17 in the embodiment shown here are designed as lateral portions of the dent-resistant transitional area 16 of end wall 14 of the passenger compartment. It would also be possible that only the lateral portions of transitional area 16 of end wall 14 that form deflecting ramps 17 are formed of a multi-layer or multi-wall lightweight plate. It is equally possible that the lateral portions of transitional area 16 that form deflecting ramps 17 are reinforced with glued, welded, or similarly fastened multi-layer or multi-wall lightweight plates so that particularly dent-resistant deflecting ramps 17 are created. Deflecting ramps 17 extend over their entire height approximately at right angles to the lengthwise central plane of the motor vehicle and are made flat throughout. Deflecting ramps 17 are located preferably at an angle α (FIG. 5) of between 30 and 60°—as shown—with respect to the imaginary indicated extension of vehicle floor 10. Alternatively, deflecting ramps 17 that are slightly curved over their length are possible as an alternative.

Figure 4:
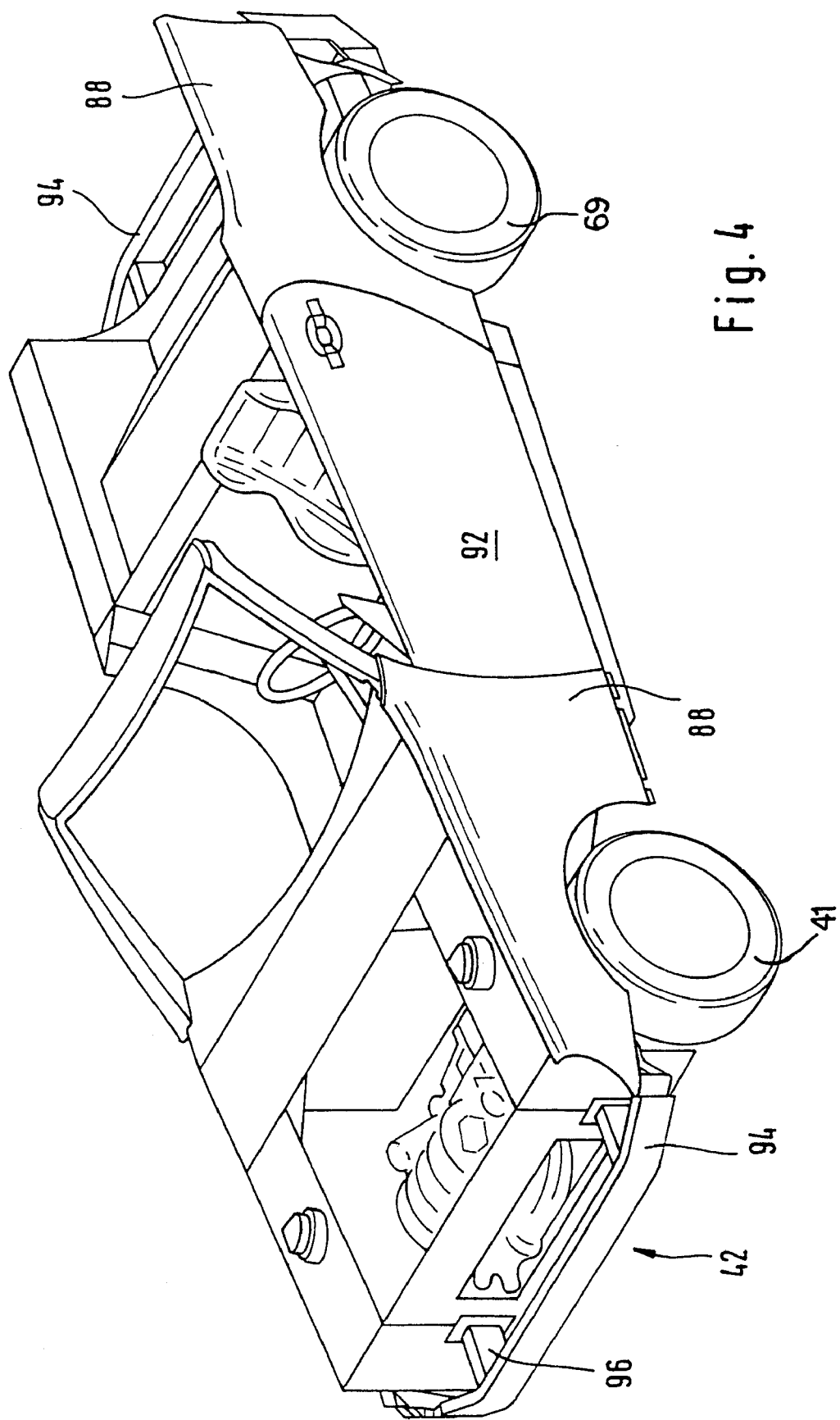
FIG. 4 is a perspective view from diagonally at the front of the supporting structure according to FIGS. 1–3, partially paneled with covering parts.
Figure 5:
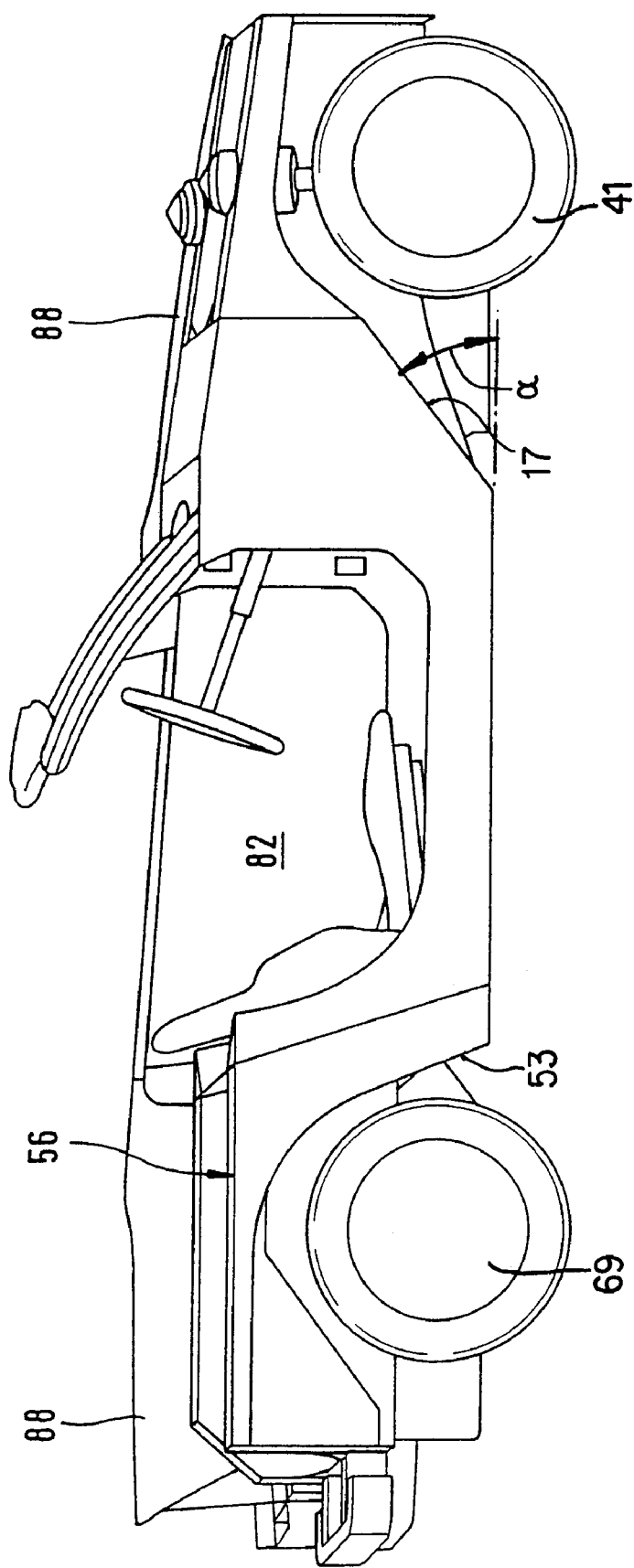
FIG. 5 shows a side view of the partially paneled supporting structure and of the vehicle of FIGS. 1–4.
Figure 6A:
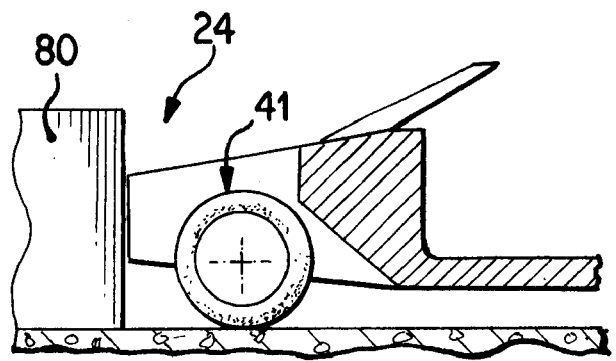
FIG. 6 shows five schematic side views of the front crumple zone and the forward area of the safety passenger compartment located behind it with the five views 6.1 to 6.5 showing successive stages of a front end collision of the motor vehicle with an obstacle.
Figure 6B:
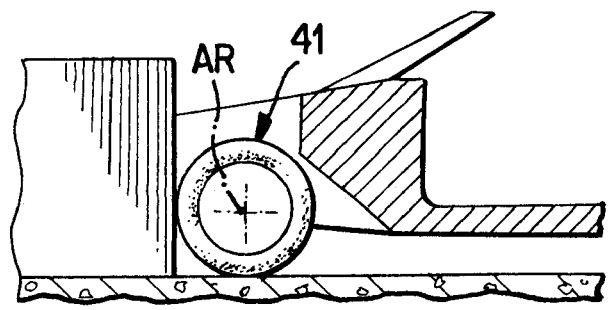
Figure 6C:
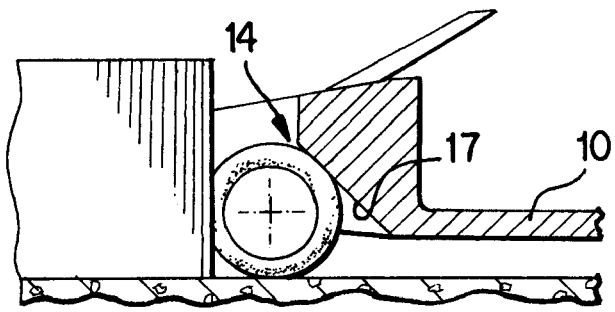
Figure 6D:
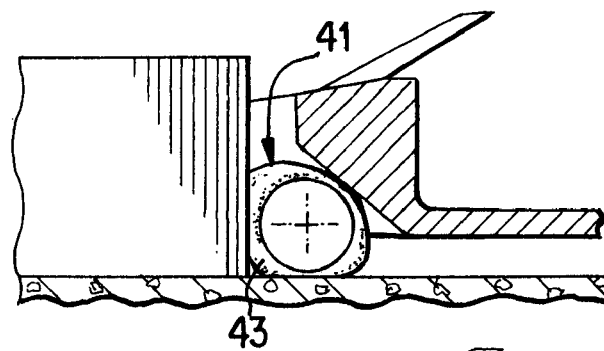
Figure 6E:
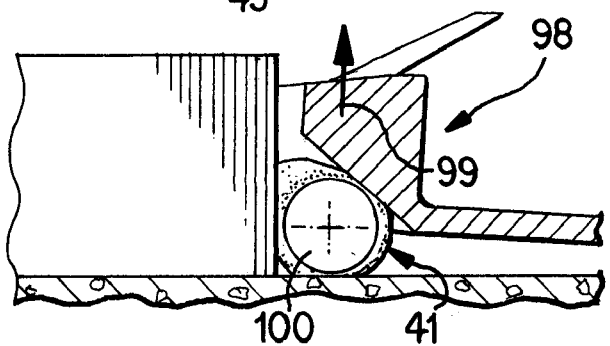

It is clear, especially in FIG. 2 and FIG. 3, that floor 10 makes a transition at the rear into a rear partition 52 projecting backward and upward which delimits the safety passenger compartment at the rear and consists of a lightweight panel. Rear partition 52 extends between side walls 32 for approximately the entire width of floor 10. Behind rear partition 52, the supporting structure has a rear structure 54 designed as a rear crumple zone with rear lengthwise beams 56 made of lightweight panels that each have plate legs 58, 60 in the vertical direction of the vehicle that are bent in the lengthwise direction of the vehicle. In the vicinity of a rear axle, not shown, the vertical plate legs 58 are provided with an internal wheel cutout 62. At the rear end of the rear lengthwise member 56, a rear module 64 is fastened which is associated here with a rear wall 66 that is extended in the transverse direction of the vehicle and slightly vertically in the lightweight structure. Side walls 32 are extended rearward up to rear wall 64 and each is provided with a wheel cutout 62 of a rear wheel arch 68. Altogether, the respective vertical and associated transverse plate legs 58, 60, the corresponding narrow rib 70, the rear partition 52, and the rear wall 64 form the rear wheel arch 68 of the supporting structure in which a rear wheel 69 held by wheel guide members is located (FIGS. 4, 5). The vertical plate legs 58 of the rear lengthwise support 56 are joined to form a box by a plate arrangement 72 permanently with one another and consisting of lightweight panels 74, 75, 76.

Between the safety passenger compartment and the rolling circumference of the two rear wheels 69, a deflecting surface 53 for the associated rear wheel 69 and running diagonally to the central lengthwise axis of the motor vehicle is provided and is in the form of a deflecting ramp directed diagonally downward. These two rear deflecting ramps 53 are dent-proof and designed as lateral sections of rear separating wall 52 of the passenger compartment. Here again, it would be possible that only the lateral portions of the rear partition 52 forming deflecting ramps 53 are made of a multi-layer or multi-wall lightweight panel. Similarly, the lateral portions of rear partition 52 forming the rear deflecting ramps 53 could be multi-layer or multi-wall lightweight structural panels reinforced by gluing, welding, or a similar fastening method. The deflecting ramps are preferably of a form that is flat or curved over its length.

FIGS. 4 and 5 show in perspective or in a side view a supporting structure below the covering that is partially covered by covering parts. On the right side of the supporting structure the forward and rear mudguards that form trim parts 88 are fastened to corresponding receptacles in the supporting structure. The door inner shells 82 are covered by door paneling 92 adapted to the surrounding trim parts 88, in this case the associated front and rear mudguards. The respective front or rear wheel arches 40, 68 can also be delimited by wheel arch coverings made of plastic, not shown here, and adapted to the wheel circumference with which plastic the deflecting ramps 17, 53 are covered. The front module 42 shown in FIG. 4 also comprises the lower transverse support 94 located in front of the lightweight panel and fastened by two lengthwise legs 96 to the lightweight panel and to the lengthwise members 56. At the rear end of the vehicle, a similar transverse member 94 is fastened.

FIG. 6 shows five schematic side views in the front crumple zone 24 and the adjoining forward area of the safety passenger compartment located behind it, with the five illustrations 6.1 to 6.5 showing successive stages of a frontal impact of the motor vehicle with a moving or standing obstacle 80. Illustration 6.1 shows the impact of the motor vehicle with obstacle 80 and the beginning of the crash-induced deformation of front crumple zone 24. At point in time 6.2, the part of the front end structure 24 which is in front of front wheel 41 in the non-deformed initial state in the lengthwise direction of the vehicle, is expanded to absorb energy, and the front wheel because of the advancing deformation of the front end, strikes the obstacle 80. It is clear that deflecting ramps 17 with front wheels 41 completely compressed extend up to the height of the upper end. In 6.3, the point in time is shown at which the front wheel 41 moved rearward by the crash-produced collapse of front crumple zone 41 in the rearward direction, strikes the deflecting ramp 17 located behind. View 6.4 shows the further progress of the impact and how front wheel 41 which has struck the obstacle is trapped between the diagonally downwardly directed deflecting ramp 17 and the surface of the road, whereby the air can escape from tire 43 because of this pinching effect. Finally, view 6.5 shows a point in time representing the impact at which the wheel moved by further deformation of the front crush zone 41 against deflecting surface 17 is pushed below floor 10 of the motor vehicle at front end 14 of the passenger compartment in the direction of the passenger compartment. The forward end 98 of the passenger compartment which faces front end structure 24, as a result of the crash-produced cooperation of front wheels 41 with the rigid deflecting ramps 17, as indicated by arrow 99, is raised relative to the front end structure 24. In other words, the passenger compartment rests on the very rigid rim 100 of front wheels 41 by deflecting ramps 17 and slides on it relative to front end structure 24. In order for the lifting of the front end structure shown in 6.5 to be reliably guaranteed, deflecting ramps 17 with wheels 41 completely compressed must extend at least to the level of the wheel rotation axes AR. The lifting of the front end 98 of the passenger compartment is dependent on the tilt angle a of deflecting ramps 17 and also on the adjustment of the diameter of wheels 41 or the rims to the position and shape of deflecting ramps 17. According to the cooperation of front wheels 41 with rigid deflecting ramps 17 shown here, the rear wheels 69 also cooperate with the associated rear deflecting ramps 53, which extend in the supporting structure shown in FIGS. 1 to 5 up to approximately the height of the top edge of the wall.

The overwhelming majority of the lightweight panels in the support structure shown here are preferably of the sandwich design, with honeycomb structure, in wood, in aluminum, as composite fiber, as extrusion-molded profiles, or the like, and have a flat and simple shape. The deflecting ramps 17 and 53 manufactured from an extrusion-molded profile in particular are made correspondingly thick in order to guarantee sufficient resistance to denting.

Instead of the supporting structures described above, made of lightweight structural panels, the body designs, shell designs, or frame designs in conventional use today can also be used in which, between the safety passenger compartment and the rolling circumference of the two wheels 41, 69 of the corresponding crumple zone 24, 54, a downwardly directed diagonally deflecting ramp 17, 53 is located. The rigid deflecting ramps 17, 53, can be made as a portion of a limiting wall 14, 52 of the passenger compartment or can be fastened to such a boundary wall. In addition, the deflecting ramps can be located at a distance in front of or behind a boundary wall 14, 52 of the passenger compartment and for example are fastened to a lengthwise support or other supporting member of the front end or rear structure 24, 54, or the passenger compartment. Similarly, it would also be possible for the diagonally downwardly directed deflecting ramps 17, 53 not to run at right angles to the lengthwise central plane of the motor vehicle but instead for example to run slightly deflected toward the middle of the vehicle. Accordingly, a wheel moved by a crash against the deflecting ramp would not only be sunk below the floor but also in the direction of the middle of the vehicle. The deflecting ramps 17, 53 can be made of a different sufficiently dent-resistant material instead of a lightweight structural panel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle with a supporting structure provided at at least one end of a safety passenger compartment with a crumple zone and two laterally located wheel arches in each of which a wheel is located whereby, between the safety passenger compartment and a rolling circumference of the two wheels associated with the crumple zone in a straight-ahead position, a deflecting surface running diagonally to a central lengthwise axis of the motor vehicle is provided for the associated wheel, said deflecting surface being adapted to deflect the wheel that is operably moved against the deflecting surface by a crash-produced deformation of the crumple zone past the end of the passenger compartment, wherein the deflecting surfaces are deflecting ramps directed diagonally downward, said deflecting ramps being adapted to lower the wheels, upon the collapse of the crumple zone, below a floor of the motor vehicle in a direction of the passenger compartment.

2. A motor vehicle according to claim 1,
wherein the respective deflecting ramps are formed by a dent-resistant limiting wall of the passenger compartment.

3. A motor vehicle according to claim 1,
wherein the deflecting ramps extend for an entire vertical extent approximately at right angles to the lengthwise central plane of the motor vehicle.

4. A motor vehicle according to claim 1,
wherein bottoms of the deflecting ramps extend at least up to the height of the wheel rotational axes when the wheels are substantially compressed.

5. A motor vehicle according to claim 1,
wherein the crumple zone is a front end structure with a front end of the passenger compartment facing the front end structure being adapted to operably be raised by a crash-produced cooperation of the front wheels with the deflecting ramps relative to the front end structure.

6. A motor-vehicle according to claim 2,
wherein the deflecting ramps are lateral portions of a substantially dent-resistant front end wall area of the passenger compartment.

7. A motor vehicle according to claim 6,
wherein the front wall area of the supporting structure that forms the deflecting ramps is formed by a multi-layer or multi-wall lightweight structural panel.

8. A motor vehicle according to claim 7,
wherein the end wall having the deflecting ramps in a lower area is designed entirely as a flat plate that extends at least approximately over an entire width of the vehicle.

9. A motor vehicle according to claim 1,
wherein a foot area of the motor vehicle is delimited by a supporting box for the front end structure that is formed of lightweight structural panels, with the supporting box comprising a front area of a vehicle floor and an end wall comprising an upper plate arrangement as well as lateral plates.

10. A motor vehicle according to claim 9,
wherein the entire supporting structure of the motor vehicle is assembled from substantially flat plates that are covered by outer trim parts.

11. A motor vehicle according to claim 1,
wherein both ends of the vehicle are provided with respective crumple zones and deflecting surfaces.

12. A motor vehicle comprising:
a safety passenger compartment,
a crumple zone connected to an end of the safety passenger compartment and extending over laterally spaced wheel wells, and
deflecting ramps directed diagonally downward and operable to deflect the wheels downwardly below a floor of the safety passenger compartment during a collision with collapsing of the crumple zone.

13. A motor vehicle according to claim 12,
wherein the respective deflecting ramps are formed by a dent-resistant limiting wall of the passenger compartment.

14. A motor vehicle according to claim 12,
wherein the deflecting ramps extend for an entire vertical extent approximately at right angles to a lengthwise central plane of the motor vehicle.

15. A motor vehicle according to claim 13,
wherein the deflecting ramps extend at least up to a height of wheel rotational axes when the wheels are substantially compressed.

16. A motor vehicle according to claim 12,
wherein the crumple zone is a front end structure with a front end of the passenger compartment facing the front end structure being adapted to operably be raised by a crash-produced cooperation of the front wheels with the deflecting ramps relative to the front end structure.

17. A motor vehicle according to claim 14,
wherein the deflecting ramps are lateral portions of a dent-resistant front end wall area of the passenger compartment.

18. A motor vehicle according to claim 12,
wherein the front wall area of the supporting structure that forms the deflecting ramps is formed by a multi-layer or multi-wall lightweight structural panel.

19. A motor vehicle according to claim 12, wherein the deflecting ramps are located at an angle of between 30° and 60° with respect to said floor.

20. A method of making a motor vehicle comprising:
a safety passenger compartment,
a crumple zone connected to an end of the safety passenger compartment and extending over laterally spaced wheel wells, and
deflecting ramps directed diagonally downward and operable to deflect the wheels downwardly below a floor of the safety passenger compartment during a collision with collapsing of the crumple zone,
said method comprising forming the deflecting ramps as a multi-layer lightweight structural panel.

* * * * *